US012720123B2

(12) United States Patent
Tichelaar et al.

(10) Patent No.: US 12,720,123 B2
(45) Date of Patent: Aug. 25, 2026

(54) HDR VIDEO RECONSTRUCTION BY CONVERTED TONE MAPPING

(71) Applicant: KONINKLIJKE PHILIPS N.V., Eindhoven (NL)

(72) Inventors: Johannes Yzebrand Tichelaar, Eindhoven (NL); Roeland Focco Everhard Goris, Veldhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 18/864,028

(22) PCT Filed: May 2, 2023

(86) PCT No.: PCT/EP2023/061500
§ 371 (c)(1),
(2) Date: Nov. 8, 2024

(87) PCT Pub. No.: WO2023/217577
PCT Pub. Date: Nov. 16, 2023

(65) Prior Publication Data
US 2025/0301184 A1 Sep. 25, 2025

(30) Foreign Application Priority Data
May 12, 2022 (EP) .................................... 22172930

(51) Int. Cl.
*H04N 19/98* (2014.01)
*H04N 19/33* (2014.01)
*H04N 19/46* (2014.01)

(52) U.S. Cl.
CPC ............. *H04N 19/98* (2014.11); *H04N 19/33* (2014.11); *H04N 19/46* (2014.11)

(58) Field of Classification Search
None
See application file for complete search history.

(56) References Cited

U.S. PATENT DOCUMENTS

2019/0130542 A1* 5/2019 Tichelaar .................. G06T 5/90

FOREIGN PATENT DOCUMENTS

EP 3921307 A1 3/2020
EP 3672218 A1 6/2020
(Continued)

OTHER PUBLICATIONS

International Search Report and Written Opinion from PCT/EP2023/061500 Mailed.
(Continued)

*Primary Examiner* — Xiaolan Xu

(57) ABSTRACT

To enable better quality decoding of HDR images which are communicated as corresponding LDR images plus luma mapping functions, applicant teaches an encoder for encoding a high dynamic range image (Im_HDR_PSEU), which high dynamic range image is represented firstly by a matrix of pixel colors (Y_SDR, Cb_SDR, Cr_SDR) of an image of lower dynamic range (Im_SDR) than the high dynamic range image, which image of lower dynamic range gets compressed for communication as a compressed lower dynamic range image (Im_C), and also represented secondly by metadata (SEI) of the image which comprises a luma mapping function for calculating high dynamic range pixel lumas (Y_HDR) of the high dynamic range image by applying the function to pixel lumas of the image of lower dynamic range, wherein the encoder comprises an input (997) for receiving the luma mapping function (LMF) from an inverse tone mapping system (200), which is arranged to derive said luma mapping function based on analyzed properties of a master low dynamic range image (Im_LDR_mastr) for constructing the corresponding high dynamic range image (Im_HDR_PSEU), characterized in that the encoder comprises a mapping splitting unit (901) arranged to transform the luma mapping function into a stretched luma mapping function (LMF_HS) which has a shape which maps a maximum normalized input to a maximum normalized output, and arranged to determine a scaling value (SCAL), the encoder having a formatter (104) arranged to output this stretched luma mapping function (LMF_HS) and this scaling value (SCAL) as metadata of the image of lower dynamic range (Im_SDR) which is also output.

9 Claims, 5 Drawing Sheets

(56) References Cited

FOREIGN PATENT DOCUMENTS

| | | | |
|---|---|---|---|
| WO | 2014128586 | A1 | 8/2014 |
| WO | 2015180854 | A1 | 12/2015 |
| WO | 2021202933 | A1 | 10/2021 |

OTHER PUBLICATIONS

Anonymous: "Methods for conversion of high dynamic range content to standard dynamic range content and vice-versa", Apr. 1, 2019 (Apr. 1, 2019), XP055670590, Retrieved from the Internet: URL:http://www.itu.int/dms_pub/itu-r/opb/r ep/R-REP-BT.2446-2019-PDF-E.pdf [retrieved on Feb. 20, 2020].

ETSI TS 103 433-1, "High-Performance Single Layer High Dynamic Range (HDR) System for use in Consumer Electronics devices; Part 1: Directly Standard Dynamic Range (SDR), Compatible HDR System (SL-HDR1)," V1.3.1, Mar. 2020.

* cited by examiner

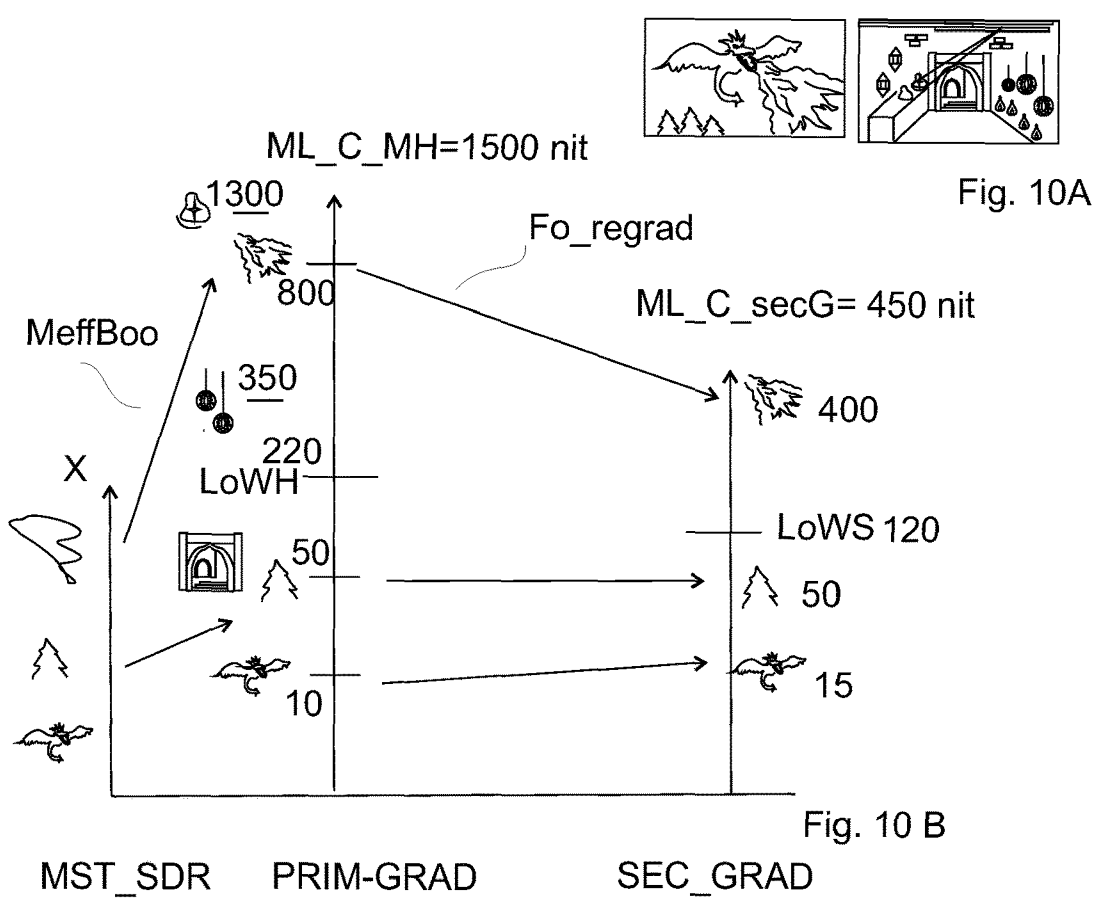
Fig. 10A
Fig. 10 B
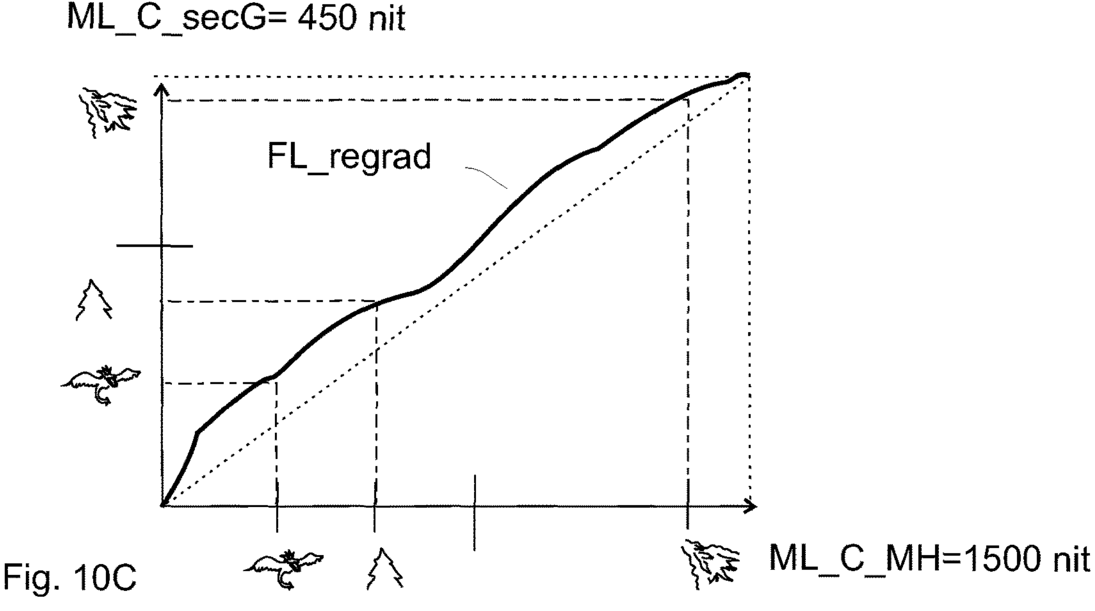
Fig. 10C
Fig. 10

HDR VIDEO RECONSTRUCTION BY CONVERTED TONE MAPPING

CROSS-REFERENCE TO PRIOR APPLICATIONS

This application is the U.S. National Phase application under 35 U.S.C. § 371 of International Application No. PCT/EP2023/061500, filed on May 2, 2023, which claims the benefit of EP Patent Application No. EP 22172930.4, filed on May 12, 2022. These applications are hereby incorporated by reference herein.

FIELD OF THE INVENTION

The invention relates to methods and apparatuses of reconstructing high dynamic range (HDR) images from received Low Dynamic Range (LDR) images, which together with a tone mapping function comprise information necessary for decoding—at a receiving side of a video communication system—a close reconstruction of the master HDR image which was created and encoded at the transmission side, and corresponding encoding methods.

BACKGROUND OF THE INVENTION

Until the first research around 2010 (and before deployment of first purchasable HDR decoding tv's in 2015), at least for video all videos were made according to the universal Low Dynamic Range (LDR) a.k.a. Standard Dynamic Range (SDR) encoding framework. This had a number of properties. Firstly, there was only one video made, which was good for all displays. The system was relative, with white being the maximum (100%) signal, encoded with maximum luma code (255 in 8 bit YCbCr encoding), corresponding to maximum non-linear RGB values: R'=G'=B'=255. There was nothing brighter than white, but all typical reflective colors (e.g. a piece of paper will also at maximum reflect all incoming light, or absorb some of the red wavelengths leaving the blue and green to reflect back to the eye resulting in a cyan local color, which is by definition somewhat darker than the paper white). Each display displayed this whitest white (as "driving request") as whichever brightest color it was technically constructed to render, e.g. 80 nit (the easier written name of the SI quantity Cd/m^2) on a computer monitor, and 200 nit on an LCD display with TL backlight. The viewer's eye quickly compensated for the difference in brightness, so when not side by side in a shop, at home all viewers saw approximately the same image (despite differences in display).

One wanted to improve on the perceivable look of the image, by making not just colors as they could be printed or painted on paper, but real glowing pixels, much brighter than the "paper white" a.k.a. "diffuse white".

Some systems, like BBC's HLG, do this by defining in the coded image values above white (white being given the reference level of "1", or 100%), e.g. up to 10× white, which could define 10× more brightly glowing pixels to be displayed.

Most systems by now have also moved to a paradigm in which the video creator can define absolute nit values (i.e. not 2× or 10× compared to the undefined white level which gets converted to a variable actual nit output on each end-point display) for his image, on an elected target display dynamic range capability. The target display is a virtual (intended) display at the video creation side, e.g. a 4000 nit (ML_C) target display for defining a 4000 nit specific video, and any actual consumer's end-point display may have a lower display maximum luminance (ML_D), e.g. 750 nit. In such a situation, the end-display would still need to contain luminance re-mapping hardware or software, which is typically realized as luma mapping, which somehow conformizes the pixel luminances in the HDR input image which have too high a luminance dynamic range (specifically its maximum luminance) to be faithfully displayed, to values on the end-display dynamic range. The simplest mapping simply clips all luminances above 750 nit to 750 nit, but that is the worst manner of handling the dynamic range mapping, since then the beautiful structure in a 4000 nit image of a sunset having sunlit clouds in the range of e.g. 1000-2000 nit clips away, and displays as a white uniform 750 patch. Better luma mappings would move the 1000-2000 nit sub-range in the HDR input image to e.g. 650-740 of the end-display dynamic range, by a suitably determined function (which can be determined either autonomously inside the receiving apparatus, e.g. a tv, STB and the like; or determined by the video creator as most suitable for his artistic movie or program, and co-communicated with the video signal). Luma means any encoding of the luminance, e.g. in 10 bit, with a function which allocates the 0-1023 luma codes to the e.g. 0.001-4000 nit video luminances, by means of a so-called Electro-Optical Transfer function (EOTF).

The simplest systems are merely transmitting (with a suitably defined EOTF) the HDR e.g. 4000 nit max. luminance image per se. This is what the HDR10 standard does. More advanced systems, like HDR10+, may also communicate a function for down-mapping the 4000 nit image to lower dynamic range, e.g. 750 nit. They make this easy by defining a mapping function between two different maximum luminance version images of the same scene image, and then using an algorithm to calculate a deformed version of that function to calculate other versions of that function to calculate endpoint functions for other display maximum luminances. E.g., if one agrees to define SDR images, when newly interpreted not as relative images but also absolute-nit images, always to go to a maximum pixel luminance of 100 nit, the video creator can define and co-communicate a function specifying how to map the 0.001 (or 0)—4000 nit luminances, being the first reference image grading, to the corresponding desired SDR 0-100 nit luminances (being the secondary reference grading), which is called display tuning or adaptation. If one defines a function which boosts the darkest 20% of the colors, in a normalized to 1.0 plot for both 4000 nit ML_C input image (horizontal axis) and 100 nit ML_C secondary grading/reference image, by say a factor 3, i.e. when going down from 4000 nit all the way to 100 nit, if one needs to go down to 750 nit in some specific end-user tv, the needed boost may be e.g. only 2× (depending on which definition EOFT one uses for the lumas, since as mentioned the luminance mapping is typically realized in practice in the color processing IC/pipeline as a luma mapping, e.g. using a psychovisually uniformized EOTF, as this allows defining the impact of luminance changes along the range more visually uniformly, i.e. more relevant and visually impactful for humans).

A third class of even more advanced HDR encoders, take this two reference grading images to the next level, by re-imaging it in another manner. If one limits oneself to using largely invertible functions, one can actually transmit the LDR image which can be calculated at the transmitting side by down-mapping the luminances or lumas of the e.g. 4000 nit HDR image to the SDR image, as a proxy for the actual master HDR image that was created by the video creator, e.g. a Hollywood studio for a BD or OTT supply, or a broadcaster of a sports program, etc. The receiving side apparatus can then apply the inverted function to reconstruct a close reconstruction of the master HDR image. We will call the systems which communicate a HDR image itself (as it was created) "mode-HDR", and the systems which communicate an LDR image a "mode-LDR coder".

A typical example is shown in FIG. 1 (e.g. summarizing principles the present applicant previously patented in e.g. WO 2015/180854), including the decoding functionality per se, and the display adaptation as a following block, which two techniques should not be confused.

FIG. 1 schematically shows a video coding and communication, and handling (displaying) system. On the creation side, we show a typical encoder (100) embodiment. The skilled person understands we first show the per-pixel processing pipeline of the luminance processing (i.e. through which all pixels of an input HDR image Im_HDR (typically one of the several master HDR images of the video as created by the video creator, the creation details such as camera capturing and shading or offline color grading being omitted as they are understandable to the skilled person and don't improve this present elucidation) are sequentially processed), and thereafter the video processing circuits which operate on an entire image. E.g. DCT compression of MPEG or similar compressors like AV1 will work on blocks of pixels. We will assume for a moment—without wanting to limit teachings—that the input image is a master HDR grading which is created by some human color grader. He will decide—after electing a maximum luminance for the master grading video—where to position (average luminance-wise) various video objects on the available range, so that the images have optimal impact to the consumer. E.g., classical averagely-lit objects may have luminances comparable to the luminances they would get in a LDR grading, whereas various kinds of HDR effect objects (bright sunlit clouds, explosion fireballs, lamp shades, objects lit by flashlights or sunbeams, etc.) may get various luminances in the higher sub-range of the available luminance range, e.g. above some local scene white level). Some of these luminance levels may dynamically change in various images, e.g. if a dark corridor gets lit increasingly by switching on successive rows of TL lamps on the ceiling.

In FIG. 10 we have shown two different scene images from a movie (dragon and suk, see FIG. 10A), for which the creator has elected it is best defined on a 1500 nit master HDR maximum luminance (ML_C_MH) luminance range (i.e. the master is the optimal representation of this video, which the creator judged best, because e.g. it gives a good HDR effect for the fiery breath of the dragon etc., although it will be necessary to make secondary, less optimal, but still as similar as possible (re) gradings). One can imagine this as selecting first a canvas shape for a painting, and then start painting the optimal composition. So indeed, for the master HDR video (PRIM_GRAD) the human grader (or automaton) will select various average luminances around which the pixel luminances of different image objects are spread. E.g., diffuse reflecting objects may be normally bright, e.g. below a selected level LowH, which is e.g. 220 nit (or a corresponding secondary (re) grading (SEC_GRAD) ending at secondary grading maximum luminance ML_C_secG, a corresponding secondary limit level (lowS) of the normally bright objects may be taken to be e.g. 120 nit (roughly this level may correspond to the majority of the pixel colors which would be present in an SDR image, when re-interpreted on this respective luminance range). The dragon may be made black, e.g. with average luminance 10 nit, whereas the trees may be around 50 nit. Despite being large in area, for maximum impact the grader may give the flames a luminance spread around 800 nit. A specular reflection on a metallic vase in a sunbeam in the suk image may reach pixel luminances up to e.g. 1300 nit. The hanging lamps should also be above-average bright, but in a more modest manner, e.g. 350 nit, because they are not to grab attention (in contrast to the dragon's flames, which would be looked at by the viewer if they were only 20 nit, but then they would appear less realistic or impressive).

As shown in the two luminance ranges projection representation of FIG. 10B, when re-grading a secondary image, e.g. on a smaller luminance dynamic range, the grader will have to find corresponding luminance positions for all objects (of any image). E.g. the flames are projected by object projection Fo_regrad to the 400 nit level, because on this limited range one still wants a quite impressive flame, and there happens to be not much which is brighter and significant in this movie. The trees may get an equi-luminance projection, and the dragon may e.g. be brightened somewhat to account for an expected lesser deep black capability of the secondary grading SEC_GRAD.

As can be seen in FIG. 10C, at least for the purpose of pragmatic consumer video communication (i.e. broadcast, cinema movies, etc.), or video conferencing and the like, this re-grading can typically be summarized on a 2D plot, by a shape of some luminance mapping function FL_regrad (sometimes shown in a normalized to 1.0 plot). Also shown in FIG. 10B on the left, is that sometimes one doesn't start from a master HDR image which is created as a starting image by the video creator. Sometimes one may start from an SDR image, which may be called the SDR master (MST_SDR), by using some up-grading algorithm to obtain the master HDR image (i.e. PRIM_GRAD in FIG. 10B). E.g., one may use a strong boosting function (MeffBoo) for the brightest objects in the SDR image of the dragon. Note that in principle SDR images do not have a maximum luminance when allocating luminances on the master HDR luminance range, but one can pretend the SDR image goes until 100 nit e.g.

Returning to FIG. 1, we assume we start from an HDR pixel luminance L_HDR (note some systems may already start working from lumas), which is sent through an elected HDR inverse EOTF in luma conversion circuit 101, to obtain a corresponding HDR luma Y_HDR. N.b. the EOTF is a-typically fixed-function to obtain luminances from luma codes coding those luminances, not to be confused with re-grading functions, which may typically have different, optimal shapes for the various scene images. E.g., the Perceptual Quantizer EOTF may be used. This input HDR luma is luma mapped by luma mapper 102, to obtain a corresponding SDR luma Y_SDR. In this unit the colorimetric savvy is applied. I.e. there will be an input connection UI to a suitably determined shape of luma mapping function (LMF). Broadly speaking two classes can exist. Offline systems may employ a human color grader to determine according to his artistic preferences the best LMF via color grading software. We assume without limitation the LMF is defined as a LUT which is defined with the coordinates of a few node points (e.g. (x1, y1) for the first node point). The human grader may set the slope of the first line segment, i.e. the position of the first node point, because there is e.g. dark content in the image, and he wants to keep it sufficiently visible when displayed on lower dynamic range displays, e.g. specifically on the 100 nit ML_C image for a 100 nit ML_D LDR display.

A second class, which is an important embodiment for which the present technologies as presented below are important, uses an automaton. Those automatons analyze the image (which luminances are present, where, and in which amounts, etc.), and propose a best LMF function shape. A specifically interesting automaton, the so-called ITM ("inverse tone mapping"), does not analyze the master HDR image, but rather an input LDR image at the creation side, and makes a pseudo-HDR image for this LDR image. The term pseudo here is not intended to mean that we have a lesser quality HDR image, but rather that is has been calculated from what started out as an LDR image (possibly a high quality LDR image, with not too much clipping, a typically higher than 8 bit digitization, e.g. 10 or 12 bit luma, not too much DCT or other compression artefacts and the like), instead of being directly generated as an original master HDR, e.g. by grading by a human color grader on digital movie original camera capture RAW coding interspersed with computer graphics objects, etc. This is very useful, because the majority of videos was shown as LDR, and may even today or in the near future be created as SDR (at least, e.g. some of the cameras in a multi-camera production may output SDR, e.g. a drone capturing side-footage of a sports game, and this side-footage may need to be converted to the HDR format of the main program). When suitably coupling the capabilities of the mode-LDR coding system with the ITM system, the present inventors and their technical partners have been able to define a system which can double-invert. I.e. the up-grading function of the pseudo-HDR image which gets generated by analyzing the original LDR input, is substantially the inverse function of the LMF used when coding the LDR communication proxy, which is typically an SDR image to be broadcasted or unicasted to receivers, which by some of those receivers can be re-graded into a close approximation of the master HDR grading when applying the luminance mapping function(s) which are co-communicated in metadata. In this manner one can make a system which in fact communicates the original (master) LDR image, but also information for making a good HDR image for it (and if the content creating customer so desires automatically, or in other versions also with human input, e.g. tweaking the automatic settings). So in fact one is communicating to receiver(s) a HDR master image of this video (albeit by communicating proxy SDR video images).

The automaton will use all kinds of rules, e.g. determine where there are light sources in the image, but the exact details are irrelevant for the present invention's discussion, merely that it can generate some function LUP (the inverse of LMF). The function of the automaton can similarly be input via connection UI to be applied in the luma mapper 102. Note that in our simplest embodiment elucidation, there is simply one (downgrading) luma mapper 102. This need not be a limitation: since both the EOTF and the luma mapping typically map a normalized input domain [0, 1] to a normalized output domain [0, 1], there may be one or more intermediate normalized mappings which (substantially) map 0 input onto 0 output and 1 onto 1. In such a case the former, intermediate luma mapping then functions as a basic mapping, and (second in line) luma mapper 102 then functions as a corrective mapping, based on the first mapping.

The encoder now has a set of LDR image lumas Y_SDR, which correspond to the HDR image lumas Y_HDR. E.g., the darkest pixels in the scene may be so defined to be displayed as substantially the same luminance on HDR and SDR displays, but the brighter HDR luminances may be squeezed into the upper range of the SDR image, as is shown by the convex shape of the LMF function shown inside luma mapper 102, which reduces in slope (or reconverges towards the diagonal of the normalized axis system). Note that normalization is easily understand by the skilled person: one merely need to divide the luma code by power (2; number_of_bits). Normalized luminances can also be defined if so desired, by dividing any pixel luminance by the maximum of its associated target display, ML_C, e.g. 4000 nit.

So one can mentally picture an example of an indoors-outdoors scene. Since in the real world, outdoors luminances are typically 100× more luminous than indoors pixels, a legacy LDR image will show the indoors objects nicely bright and colorful, but everything outside the window is hard-clipped to uniform white (i.e. invisible). Now, when communicating HDR videos with a reversible proxy image, we will make sure that the bright outside regions seen through the window become bright (maybe even desaturated), but in a controlled manner so that sufficient information is still available for reconstruction back to HDR. This has advantages for both outputs, since any system wanting to use the LDR images only as is, will still see a nice rendering of the outdoor scene, to the extent possible on a limited LDR dynamic range.

So the set of Y_SDR pixel luminances (together with their chrominances, the details of which are unnecessary for this elucidation) will form a "classical LDR image", in the sense that later circuitry need not care about whether this LDR image was smartly generated or simply straight from camera, as in the legacy LDR systems. Ergo, a video compressor 103 applies algorithms like e.g. a MPEG HEVC or VVC compression. This is a bundle of data reduction techniques, which inter alia uses discrete cosine transform to transform a block of e.g. 8×8 pixels into a limited set of spatial frequencies, which need less information to represent them. The amount of information needed may be regulated by determining a quantization factor, which determines how many DCT frequencies are retained and how accurately they are represented. The disadvantage is that the compressed LDR image (Im_C) is not as exact as the input SDR image (Im_SDR), in particular there will be block artefacts. Depending on the elections of the broadcaster, it may e.g. so severe that some blocks in the sky are represented only by their average luminance, so they may turn up as uniform squares. This will normally not be an issue, since the compressor will determine all its settings (comprising the quantization factors) in such a manner that the quantization errors are largely invisible to the human system, or at least unobjectionable.

Formatter 104 does whatever signal formatting is needed for the communication channel (which may be different when e.g. communicating via storage on a blu-ray disk, than when e.g. DVB-T broadcasting). In general all variants will have the property that the compressed video images Im_C are bundled together in the output image signal S_im with the luma mapping functions LMF, which may change per image (or not).

Deformatter 151 does the opposite of the formatting, so that compressed LDR images and functions LMF to reconstruct the HDR images or do other useful dynamic range mapping processing can be done in later circuitry. Decompressor 152 undoes the e.g. VVC or VP9 compression, to obtain a sequence of approximate LDR lumas Ya_SDR to be sent to the inverse, HDR image reconstruction pipeline. Thereto upgrading luma mapper 153 transforms the SDR lumas into reconstructed HDR lumas YR_HDR (it uses the inverse luma mapping function ILMF, which is (substantially) the inverse of the LMF). We have shown in one elucidation figure two possible receiver (150) apparatuses, which may be present as dual functionality in one physical apparatus (to be selected by the end user which of the parallel processings to apply), or some apparatuses may have only one of the parallel processings (e.g. some set-top-boxes may only do reconstruction of the master HDR image, to store it in a memory 155, such as e.g. a hard disk).

If we have a display panel connected to the receiver embodiment, e.g. 750 nit ML_D end-user display 190, the receiver may have display adaptation circuitry 180 to calculate a 750 nit output image instead of the e.g. 4000 nit reconstruction image (we have shown this dotted, to show its an optional component, tangential to the present inventive teachings, although it will be often used in combination). Without going into details about the many variants in which display adaptation can be realized, there is typically a function determination circuit 157, which will on the basis of the shape of the inverse of the LMF, propose an adapted luma mapping function F_ADAP (which will typically lie closer to the diagonal). This function will be loaded into the display adaptation luma mapper 156 to calculate less strong HDR lumas L_MDR, in typically a smaller dynamic range, ending at ML_D=750 nit instead of ML_C=4000 nit.

There is a problem if the ITM automaton determines a LMF function which has a soft-clipping, or worse a hard-clipping for the brightest luminances. Soft- or hard-clipping means that the slope of the highest line segment (or a tangential to the curve) is small, small in particular measured with regards to typical settings of a compressor. E.g., if the compressor makes blocks in the sky, which may be the brightest object in the LDR image, the inverse LMF function of the decoder will have a large slope for its highest segment or part of the curve. This will boost the visibility of artefacts that according to normal compression principles should not be visible, leading to undesirable artefacts. One might force the human grader or automaton to only use functions which a sufficiently large slope for the brightest part of the curve, but that might be undesirable for some images from artistic point of view, and for automatons perhaps not easily programmed in their rule set.

So a generic solution of the problem is desired, as was seen as a problem to work on by the inventors. This would also have the advantage that existing algorithms for determining the optimal desired luma mapping function (LMF) shape for any HDR scene image, and the brightness characteristics of its constituent objects and their composition, e.g. using artificial intelligence (in particular when coming from ITM), does not have to be changed.

EP3621307 defines a system with which one can code a higher quality master HDR image by calculating a proxy HDR image of lower maximum coded luminance (e.g. the proxy video that is transmitted to receivers reaches or can reach pixel maximum luminance values of 800 nit, but they are supposed to represent original co-located pixel luminances up to 2000 nit). Thereto some scale-value-based deformation of a luminance mapping function which determines how to down-grade even lower dynamic range i.e. maximum luminance images from the received 800 nit proxy image, is stretched in the upwards direction to also define the re-grading relationship between the two HDR images, i.e. the creator's master HDR image and the corresponding presentation time's proxy image. This deformation moves the curve (shape-preserving) closer to the diagonal of the luma plot, i.e. so that it becomes more straight, or more approximating an identity curve, and over the entire input and output range typically (i.e. is not related to clipping behavior; note also that whether some receiving display shows some clipping behavior has nothing to do with clipping behavior at the creation or encoding side).

WO2014/128586 describes one possible manner of HDR video encoding, namely one makes a technical SDR proxy, which is not perfect visually, and adds functions in co-communicated metadata to convert it into a secondary, better-looking SDR video.

SUMMARY OF THE INVENTION

The decoding artefacts are elegantly avoided when using an encoder (100) for encoding an input high dynamic range image (Im_HDR_PSEU) as encoded data (S_im), the encoded data comprising firstly a matrix of pixel colors (Y_SDR, Cb_SDR, Cr_SDR) of an image of lower dynamic range (Im_SDR) than the high dynamic range image, and secondly metadata (SEI) of the image which comprises a luma mapping function for calculating high dynamic range pixel lumas (Y_HDR) of the high dynamic range image by applying the function to pixel lumas of the image of lower dynamic range;

wherein the encoder comprises an input (997) for receiving a luma mapping function (LMF) from a connectable or comprised inverse tone mapping system (200), which inverse tone mapping system is arranged to derive an up-grading function (LUP) based on analyzed properties of a master low dynamic range image (Im_LDR_mastr), for calculating the high dynamic range image (Im_HDR_PSEU) from the master low dynamic range image (Im_LDR_mastr) by applying the up-grading function to lumas of the master low dynamic range image (Im_LDR_mastr), and which inverse tone mapping system is arranged to invert the up-grading function (LUP) to obtain the luma mapping function;

characterized in that the encoder comprises a mapping splitting unit (901) arranged to compose the luma mapping function (LMF) into two data items, wherein the first data item is a stretched luma mapping function (LMF_HS) which is defined by mapping a clipping point (PtCli) where the luma mapping function (LMF) first reaches (a close vicinity of, or often exactly) a maximum output value (Vomax) onto an endpoint (Ptmax) which has as coordinates a maximum of an input value and the maximum of the output value, which corresponds to a horizontal scaling factor, and by mapping all points of the luma mapping function having input coordinates lower than the input coordinate of the clipping point to stretched input coordinates which are equal to the respective input coordinate multiplied by the horizontal scaling factor whilst maintaining the output coordinate of the respective curve point;

wherein the second data item is a scale factor which is preferably equal to the reciprocal of the horizontal scaling factor; the encoder having a formatter (104) arranged to output this stretched luma mapping function (LMF_HS) and this scaling value (SCAL) as metadata of the image of lower dynamic range (Im_SDR) which is also output, and a corresponding decoder which uses the inverse operation of first luma mapping and thereafter scaling with the received parameters defining those operations.

When the operation processes lumas, the present solution can both work in relative HDR systems, i.e. systems that encode by maximum luma code some amount of overbrightness as a multiple of the diffuse (LDR) white level, as on absolute display-defined HDR coding systems, which code exact pixel luminances (by corresponding luma codes) up to a maximum coded luminance ML_C, as they are intended to be shown on some target display (e.g. ML_C=5000 nit, or 1000 nit). The proxy SDR image is of such a nature that all HDR colors can be calculated with sufficient precision, by using the luma mapping function. There may of course be slight rounding errors, but the system has been demonstrated to work fine, except for the issue which is handled with the present improvement technology, when using e.g. 3× 10 bit for the Y, Cb and Cr pixel color images. Instead of SEI messages, which is the standard MPEG mechanism to communicate any specific metadata as desired, other communication standards or channels, e.g. HDMI, have their own placeholders for communicating metadata. The encoder may reside in professional systems, e.g. a television production studio, or in consumer appliances, e.g. uploading a video captured on a mobile phone for a social network site. Inverse tone mapping (ITM) system is any system which does the "inverse" (not strictly the mathematical inverse, but as a functionality) of classical tone mapping, which was defined to squeeze higher dynamic range images with a large range of luminances into a standard or low dynamic range of luminances. Ergo, ITM systems make some corresponding HDR image (also pseudo-HDR image, as it is not originally made as an HDR image) from an input LDR image, which in this text is called master LDR image (using a nomenclature similar to master HDR image). Ergo, any system which e,g, keeps the luminances (or their coding lumas) of reflecting objects as is, but boosts the luminances of emissive objects like the sun, or increases the luminance of outdoors object pixels compared to indoors pixels, etc., using any technique whether a program of heuristic rules or other techniques like machine learning techniques, can be called an ITM. For this invention, the ITM will be limited to variants which define the upgrading to the HDR image by using a luma mapping function, and typically by only using a luma mapping function. A stretched function is a function which keeps it shape, i.e. its upward or downwards excursions compared to e.g. the diagonal, at least up to some selected endpoint (losing the clipping part), but is stretched in size in some dimension. E.g., it may be pulled in the horizontal direction.

Advantageously the encoder for encoding a high dynamic range image may comprise a clipping detection circuit (904) arranged to detect whether the (Im_HDR_PSEU) has a part of its input range clipping to maximum output. Following the core principles, the split of the original LMF function into two luma processing operations, namely one which uses a regular function which maps to output maximum only when the input maximum is reached, and as secondary property thereby advantageously lies closer to the diagonal improving coding and invertibility, one may build variants which either process on a few bad LMF curves, by checking whether there is some clipping, or do some processing on all curves without the check, but then when encountering e.g. a function which already mapped 1.0 on 1.0, it keeps mapping as such.

Advantageously the encoder for encoding a high dynamic range image works on images which are defined on absolute nit dynamic ranges which end at a maximum luminance.

Advantageously the encoder for encoding a high dynamic range image works in a coding system in which the image of lower dynamic range (Im_SDR) is predefined to be a low dynamic range image which has a maximum luminance equal to 100 nit.

Advantageously the encoder for encoding a high dynamic range image has its mapping splitting unit (901) determining the stretched luma mapping function (LMF_HS) by performing a horizontal stretch which consists in linear scaling so that an input coordinate where clipping first occurs (XC) is mapped onto the maximum normalized input coordinate.

The useful new technical principles can also be embodied as a method of encoding a high dynamic range image (Im_HDR_PSEU), which high dynamic range image is represented firstly by a matrix of pixel colors (Y_SDR, Cb_SDR, Cr_SDR) of an image of lower dynamic range (Im_SDR) than the high dynamic range image, which image of lower dynamic range gets compressed for communication as a compressed lower dynamic range image (Im_C), and also represented secondly by metadata (SEI) of the image which comprises a luma mapping function for calculating high dynamic range pixel lumas (Y_HDR) of the high dynamic range image by applying the function to pixel lumas of the image of lower dynamic range, wherein the luma mapping function (LMF) is received from an inverse tone mapping system (200), which is arranged to derive said luma mapping function based on analyzed properties of a master low dynamic range image (Im_LDR_mastr) for constructing the corresponding high dynamic range image (Im_HDR_PSEU), characterized in that the method comprises a splitting the luma mapping function into two successive operations, a second one of which comprises transforming the luma mapping function into a stretched luma mapping function (LMF_HS) which has a shape which maps a maximum normalized input to a maximum normalized output, and the first one comprising a linear scaling with a scaling value (SCAL), the method being arranged to output this stretched luma mapping function (LMF_HS) and this scaling value (SCAL) as metadata of the image of lower dynamic range (Im_SDR) which is also output.

The method may comprise detecting whether the (Im_HDR_PSEU) has a part of its input range clipping to maximum output.

The method may work on images which are defined on absolute nit dynamic ranges which end at a maximum luminance, more specifically the image of lower dynamic range (Im_SDR) is a low dynamic range image which has a maximum luminance equal to 100 nit (and the HDR image may have a ML_C equal to whatever was elected suitable by the video creator, e.g. a person tuning settings of the ITM, e.g. to yield HDR images of the quality/impressiveness of ML_C=2000 nit, or 10,000 nit, etc.). The method may determine the stretched luma mapping function (LMF_HS) by performing a horizontal stretch which consists in linear scaling so that an input coordinate where clipping first occurs (XC) is mapped onto the maximum normalized input coordinate.

In particular, the skilled person understands that these technical elements can be embodied in various processing elements like ASICs (application-specific integrated circuits, i.e. typically the IC designer will make (part of) an IC perform the method), FPGA's, processors being programmed, etc., and can reside in various consumer or non-consumer apparatuses, whether comprising a display (e.g. a mobile phone encoding a consumer video) or non-display apparatuses which can be externally connected to a display, and that the images and metadata can be communicated over various image communication technologies such as wireless broadcasting, cable-based communication, and that the apparatuses can be used in various image communication and/or usage ecosystems such as e.g. television broadcasting, on-demand over the internet, video monitoring systems, video-based communication systems, etc.

BRIEF DESCRIPTION OF THE DRAWINGS

These and other aspects of the method and apparatus according to the invention will be apparent from and elucidated with reference to the implementations and embodiments described hereinafter, and with reference to the accompanying drawings, which serve merely as non-limiting specific illustrations exemplifying the more general concepts, and in which dashes are used to indicate that a component is optional, non-dashed components not necessarily being essential. Dashes can also be used for indicating that elements, which are explained to be essential, but hidden in the interior of an object, or for intangible things such as e.g. selections of objects/regions.

In the drawings:

FIG. 10 shows some examples of re-grading of typical (e.g. average) luminances of some image objects, along various ranges of possible luminances.

DETAILED DESCRIPTION OF THE DRAWINGS

Figure 1:
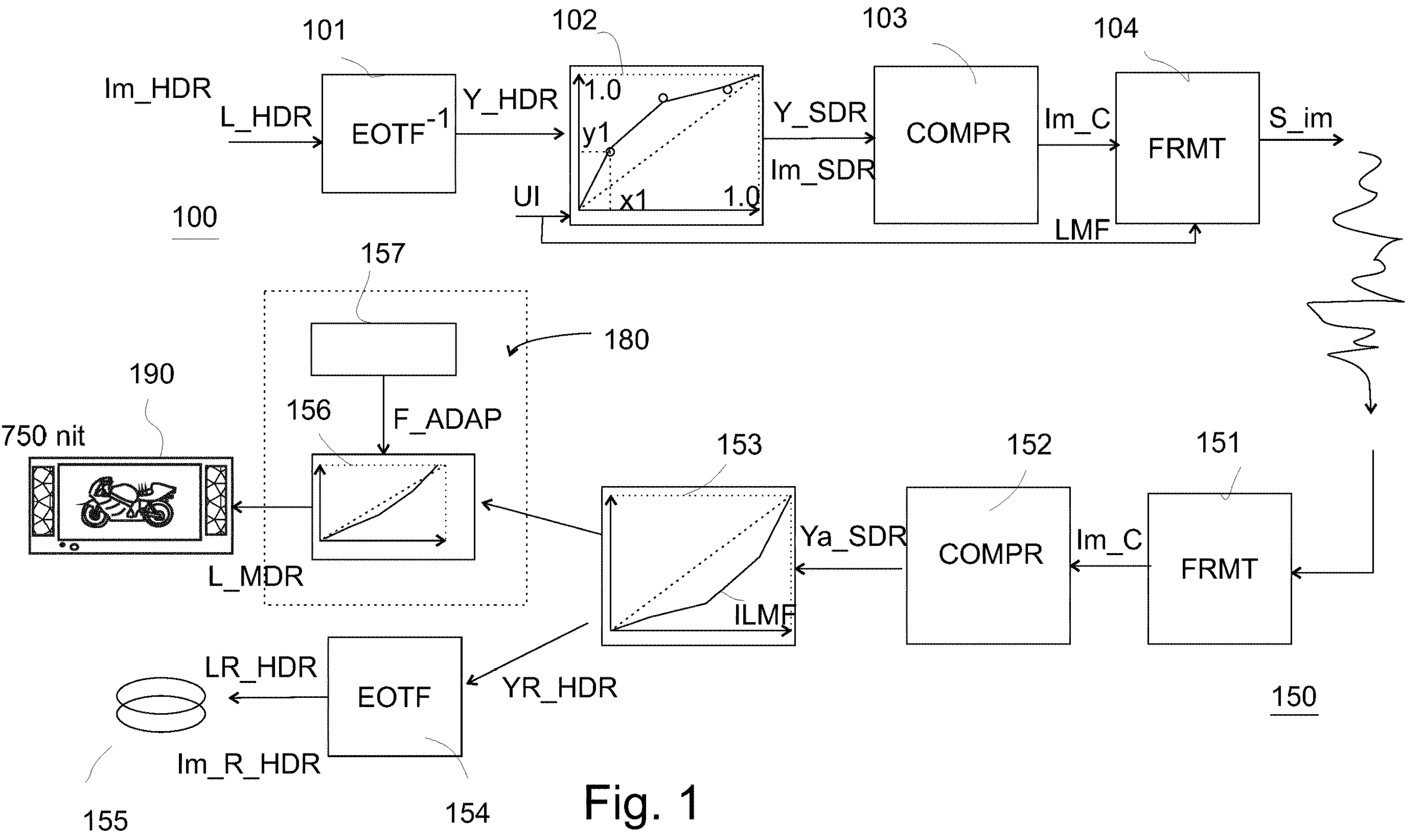
FIG. 1 schematically illustrates two possible functionalities/embodiment of a HDR image (in particular video) coding system which codes HDR images not by communicating those HDR images themselves, but LDR images which function as a proxy, which LDR images can be calculated from the HDR images by using a substantially invertible luma mapping function, and vice versa. The LDR images are typical of such a colorimetric quality that they may also be used for direct (without needing further colorimetric adjustment) on legacy LDR displays.
Figure 2:
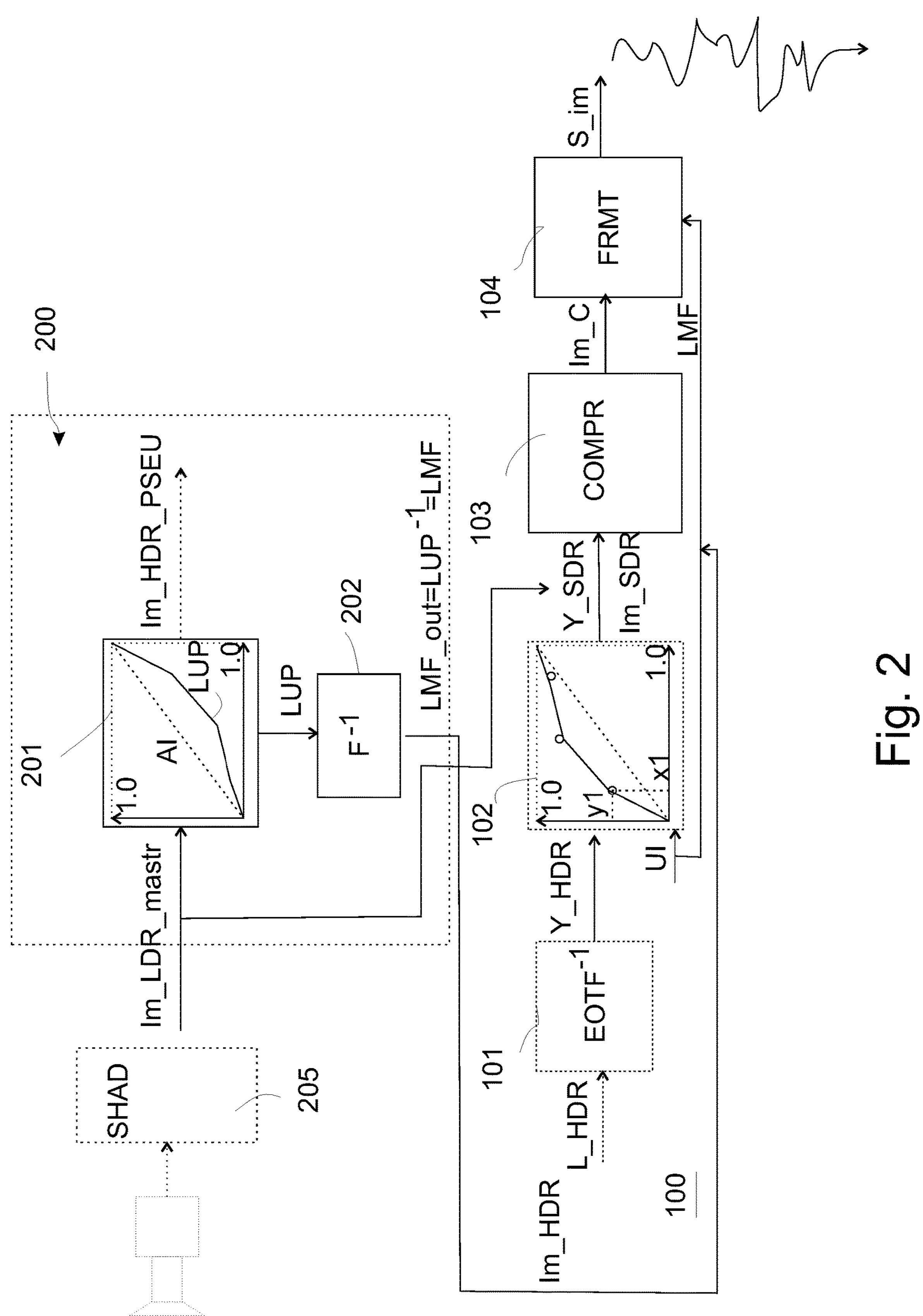
FIG. 2 shows an improved encoder for such a HDR video communication system, which is coupled to, or may comprise, an ITM circuit for generating good looking pseudo-HDR images on the basis of input master LDR images, and corresponding luma mapping curves for transforming on image into the corresponding other image.

In FIG. 2 we show the encoding side (as already explained with FIG. 1), but now together with an ITM (inverse tone mapping) system (200), which as explained doesn't start from a master HDR image (i.e. an image that was originally made as e.g. 4000 nit HDR), but from a master LDR image (Im_LDR_mastr), from which the ITM can make a nice-looking HDR image (Im_HDR_PSEU). Note that its arrow has been shown dotted, because the core system need not actually calculate the Im_HDR_PSEU, but only the calculated best up-grading function LUP, but some ITM variants may actually calculate HDR output images to calculate some of their properties (e.g. histograms of areas, relationships between brightnesses of different areas, texture measures, lighting profiles, etc.). The input apparatuses yielding the master LDR image are also shown dashed, because there may be several systems in which to incorporate the present invention. A typical application gets real-time images from a camera (or formally one or more cameras, the images of which may be e.g. mixed in a mixture master LDR video), and their luminance properties (e.g. average luminance) may have been roughly set by a shader 205. Another example is where an already finalized LDR video is taken from a memory, e.g. an old movie. A luma mapping function derivation unit 201 derives an optimal up-grading function (LUP) for the incoming LDR image(s). This function is inverted by inverter 202, which yields as output function LMF_out the inverse of the up-grading function LUP, which will serve as the luma mapping function LMF for the mode-LDR based encoder. Note however (again dotted 101, and 102) that now there need not be an actual HDR to LDR down-grading, since the ITM system will already take care of this: the master LDR image Im_LDR_mastr will function as the proxy image to be communicated in place of a native HDR image, and the inverse function of the LUP function will be co-communicated as metadata (e.g. a SEI message) for receivers to reconstruct as HDR image a close version of the (pseudo) HDR image IM_HDR_PSEU.

Figures 3, 4, 5, 6, 7, 8:
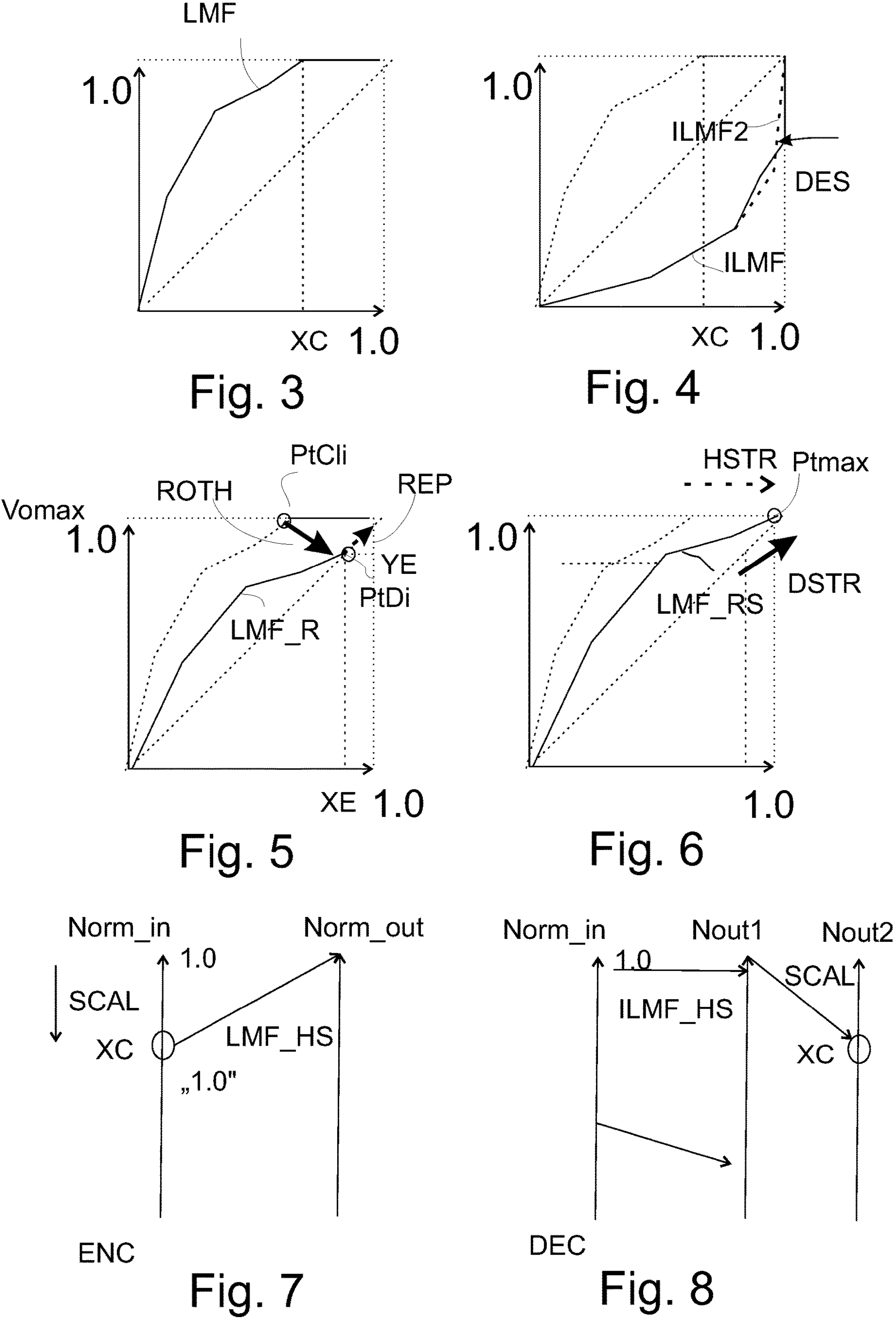
FIG. 3 schematically shows what kind of inconvenient functions (in the down-grading HDR-to-LDR mapping variant) may not seldomly be determined by some ITM variants, which function has the inconvenient property that it starts clipping too early, leading to invertibility issues.
FIG. 4 schematically shows what invertibility problem will occur: no matter how one tries to regularize the decoding, there will always be a high slope for the brightest image lumas, which is especially problematic when used with high levels of video compression, as it will show strong block artefacts which should normally be imperceivable (e.g. in the LDR image), and could be much more imperceivable and not objectionable when using a better encoding (/decoding) system as taught in the present patent application.
FIG. 5 shows a first possibility of improving the luma mapping curve from the ITM, though in itself not yet complete as it introduces another colorimetric artefact regarding the balance of image object luminances.
FIG. 6 shows a rotate-then-diagonal-stretch embodiment, which is a suitable manner of forming a better invertible luma mapping curve, which maps to maximum output only when reaching maximum input, and which is to be used together with a re-scaling operation in the decoders, to obtain substantially the same grading effect as when using the original luma mapping function LMF.
FIG. 7 shows the stretching (scaling and different/stretched luma mapping function) concept at the encoder.
FIG. 8 shows what, inverting the encoder behavior, the decoder would do: it would first apply the new stretched luma mapping function as taught by the present invention's embodiments, and then apply the corrective scaling linked to the stretching of the original luma mapping function (so that the shape of the functions would overlap); d

As schematically shown in FIG. 3, the inventors found that some of the ITM variants gave on some input images LMF curves with hard clipping. I.e. a normalized input of the luma mapper 102 equal to xc (e.g. xc=0.85 in perceptually uniformized lumas, which are approximately logarithmic) would get mapped to the maximum output of the LDR proxy image (i.e. normalized represented as 1.0, which would correspond to 8 bit code values Y=R'=G'=B'=255). With such a function, every input higher than the e.g. 0.85, would also be written in the LDR image matrix at Y=255, and the function LMF that gets communicated would have a horizontal slope beyond XC being e.g. 0.85. As shown in FIG. 4, a typical mode-LDR decoder when reconstructing the HDR output image, would have a problem with this. In theory there would be an infinite slope at LDR luma Y=255 or normalized 1.0, which means that in principle decoders couldn't even work decently with such a ILMF input function received in the metadata of that image to be processed. In practice there will be heuristic mitigations in the decoder.

E.g., the decoder may use a secondary curve ILMF2 derived from ILMF (or in fact often from LMF which may be the actual function getting communicated in metadata). Such a ILMF2 curve will typically have the same values (x,y) for all its curve locus points as ILMF, expect for the highest values. One embodiment is shown in which one splits a highest subrange of the curve in two parts, one with a small slope, and one with a steep (but not infinite) slope. But this will still lead to significant visual artefacts, especially if the quality of the MPEG compressor of the LDR proxy video was set low, i.e. making many compression artefacts, which specifically at this brightest end of the luma range get considerably boosted, and become visually more annoying.

As explained with FIG. 5, the inventors realized that they could rotate the LMF function towards the diagonal (over an angle ROTH), so that the clipping point where the horizontal segment starts falls on the diagonal, and has an equal x and y coordinate (yielding rotated luma mapping function LMF_R). This would already yield a substantially better invertible function, since now the curve is closer to an identity transform. The problem is however that the output is not exactly as was desired for this image or this particular HDR scene. E.g., instead of a pseudo-HDR luma value XC becoming (typically displayed as) the whitest white on LDR displays, an even higher value XE will only become as bright as YE (e.g. 240 in 8 bit). And only even brighter values, namely 1.0 (which may not even exist in the pseudo-HDR image in some situations) get the whitest LDR color. So the resultant image will be too dark. Since one of the benefits or even purposes of a mode-LDR coding/decoding system is consumers still watching on a legacy LDR display will get a very decent simulation LDR image corresponding to the HDR image which is ultimately communicated, this purpose would now be thwarted as they would be watching too dark images. One can see how the clipping point (the first time the curve reaches 1.0, or a value very close to 1.0 if some relaxation is allowed, e.g. dropping of a few brightest values, e.g. in a scenario which would yield soft-clipping) can be projected by rotation (ROTH) to the diagonal to obtain diagonal point PtDi, and finally endpoint Ptmax (which is shown by a stretching arrow starting from the point, but this can equivalently be represented by an arrow starting from (0, 0)).

So, as shown with FIG. 6, they considered doing an additional stretch (DSTR) along the diagonal, which makes the resultant output LDR image brighter again (ergo, we come closer to the original determined optimal LMF function, which however has a clipping part at the high end). In fact, by studying this system further, they realized that, since the rotation ROTH and the diagonal stretch DSTR substantially form an equilateral triangle, the Y values of the node points of the curve would be substantially re-obtained by the rotate-then-stretch operation yielding the rotated-stretched luma mapping function LMF_RS. Only the x points would be a different locations, which is not perfect yet. The other property of this curve is that it does still maintain its original shape (though stretched), except for the horizontal clipping part, which as explained is undesirable, at least for good quality decoding of a HDR image from the communicated LDR proxy image, which is the ultimate goal (one does not build a high quality innovative HDR codec to be only able to receive good quality LDR images, but more importantly to on the future highest quality HDR display be able to watch near perfect HDR images).

But this substantial equality of the y-values led to the further insight that one could drop the second dimension, and do everything on one dimension. Namely, one could simply do a horizontal stretch HSTR of the curve.

This leads to the property that one can use 1D mappings as shown in FIGS. 7 and 8, from which one can further design improved coding (for corresponding mirror-decoding) technologies.

As shown in FIG. 7, when showing the entire re-grading operation on a plot between normalized input Norm_in (which will have a HDR character, i.e. those lumas will encode e.g. a 2000 nit pseudo-HDR image which can be obtained from the corresponding master LDR image by ITM) and normalized output (which will be the 8 or 10 bit LDR lumas, also normalized).

If we want to have a property of this LMF_HS mapping curve (which will correspond to the LMF_RS in rotate-and-stretch embodiment, but will in our preferred embodiment result only from a horizontal stretch mapping the XC point, of the LMF curve as obtained from the ITM, onto 1.0 of the horizontal axis of the input range) that it maps 1.0 onto 1.0 instead of e.g. XC=0.8 onto 1.0, we should somehow define the point 0.8 as the new "1.0".

This could be done by a prior scaling operator in the novel encoder, which caters for inappropriate ITM LMF functions by correcting them when needed (i.e. when there is a hard clipping part in the curve). We can use a linear scaling operation which defines:

$$Norm\_in\_NEW = Norm\_in * (1/XC) \quad \text{[Eq. 1]}$$

One can see this as two units of luma mapping, if the decoder behaves correspondingly (mirror-symmetrically) as shown in FIG. 8.

If the decoder knows the scale factor SCAL of the stretch of the encoder (or any value enabling to calculate SCAL, e.g. the horizontal coordinate of the start of clipping of the LMF function XC), it can use a post-mapping block. So it first applies the inverted horizontally stretch luma mapping function ILMF_HS which maps 1.0 input onto 1.0 output, and which has the shape of the inverted LMF_RS, and then a second block does a compressive scaling with metadata communicated value SCAL (or any value related to this, which enables the calculation of SCAL at the receiving side), so that the value 1 ultimately gets mapped to XC again. This XC value will be a HDR luma, e.g. defined on the Perceptual Quantizer EOTF (which is a visually homogenized luma system, i.e. which was designed so that equal difference steps of luma have substantially equal visual impact to humans all along the luma scale), which codes e.g. an intended-to-be-displayed luminance of 2500 nit. It will be how the HDR image gets displayed e.g. if a user has a 4000 nit or 5000 nit display which can normally show such an image by directly displaying the pixel luminance intentions in their accurate nit representation. For embodiments with display adaptation, the system will take this into account to calculate as good as possible an approximation of the e.g. 4000 nit image on a e.g. 750 nit display dynamic range capability. In fact, it is not so much a very high HDR output which is required as output of the decoder, but rather a value at or around DES of FIG. 4. Note that when an intermediate luma mapping is present, this strategy may not give exactly the same result as the original clipping mapping function of the ITM, except for the correction of the infinite decoding slope behavior of course, but gives small differences. Research has in practice shown that this is not a real problem of concern. If still considered to need further improvement, the innovative encoder can calculate a slightly different SCAL value, so that the LMF_HS curve, when used together with the scaling processing, overlaps more tightly with the original LMF curve, also when intermediate mappers are present. In fact, once the splitting concept is formulated, if so desired an encoder embodiment could even adjust somewhat the shape of the LMF_HS function, as its full shape details get communicated as metadata to the decoders anyway.

A preferred manner of defining the SCAL value, is so that it can directly be used at the decoding side to scale down (which typically up-grades received SDR proxy images and then scales them lower than the theoretical maximum luminance), on some luma definition (e.g. PQ lumas). So e.g. if a value of 0.89 gets mapped to 1.0 at the encoder side, we can define the SCAL value as the value to which 1.0 should (re) map at the decoding side, i.e. 0.89 (the x-coordinate (typically normalized input value, which is normalized so it can maximally have the value 1.0) of the point of first clipping PtCli). Note that clipping detectors can work e.g. on the function, by e.g. checking that all higher input values will map to the maximum normalized output value or y-coordinate, having the value 1.0. Note that one does not need to check anything on the ITM-generatable pseudo-HDR image, since the function and the input SDR image define the pseudo-HDR image, i.e. are a coding for it. The stretch HSTR would then correspond to, for each point of the curve having output value (y-coordinate) fixed to a value Y between 0 and 1, multiplying its input value coordinate by a multiplier value equal to 1/SCAL. So e.g. an x-coordinate a.k.a. input value of the original LMF curve being equal to 0.5, would move (by multiplication with the inverse a.k.a. reciprocal scale factor 1/SCAL) to an input value of the LMF_HS curve being 0.5*1.1236-0.56, and that point would have the same y-coordinate as the original point on the LMF curve.

Figure 9:
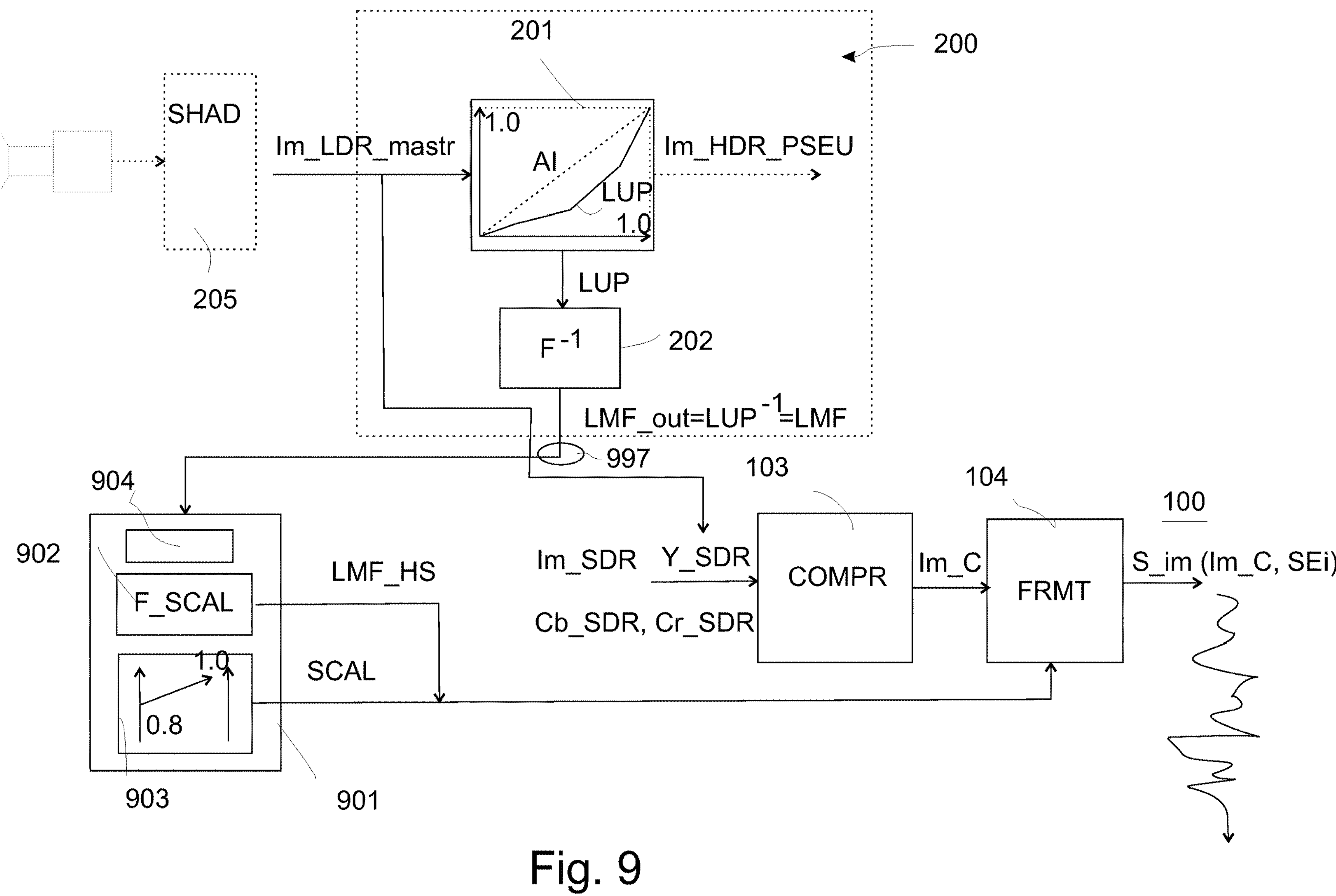
FIG. 9 is a schematic portraying of units typically found in the novel encoder following the present innovative encoding-by-regularized-luma-mapping principles.

So if the decoder is to use these two successive luma mapping stages, the new ITM-improving encoder can cater for this, as shown in FIG. 9.

FIG. 9 shows an embodiment of the improved encoder according to the present innovative insights. Most of technical units are again substantially as described above.

The innovative mapping splitting unit 901 now will put in the metadata associated with the image (or for a set of images to be similarly mapped) instead of just a luma mapping function, the adjusted luma mapping function with one of the embodiments explained with aid of FIGS. 3-8, e.g. the horizontally stretched luma mapping function LMF_HS (or the rotated-and-stretched one emerging from that embodiment). It will now also output in the metadata a corresponding scale factor SCAL, so that the totality of those two operations substantially maps the result of mapping merely with the original LMF obtained from the ITM, but with improved behavior at the decoder. Thereto it may contain a function reshaping circuit 902 arranged to determine the stretched version of the LMF so that the maximum normalized input (1.0) maps to the maximum normalized output. And it may contain a scaling factor determining unit 903 arranged to determine and output scale factor SCAL. Cb_SDR and Cr_SDR are respectively the blue and the red chroma components of a pixel color of the LDR proxy image Im_SDR, in a typical color encoding (the skilled person knows how this can be reformulated with known colorimetry techniques into e.g. an R'G'B' encoding). The image signal output S_im for communication to receivers comprises the compressed LDR image Im_C and metadata (SEI), which comprises the LMF_HS and the SCAL. Furthermore, the function reshaping circuit 902 may typically be embodied to analyze whether the LMF function is such that it needs re-shaping, e.g. it may comprise a clipping detection circuit 904 arranged to detect whether the LMF function of the ITM does clip to maximum, i.e. typically being a strictly increasing function mainly, whether an input value below 1.0 already maps to output 1.0. One may also embody the function reshaping unit to perform an identity transformation if the function needs no reshaping. The various units may physically be combined.

The scale factor is related to the start of clipping (to maximum output value), and should not be confused with other scale factors in HDR technology, e.g. a value which controls for adaptation how much a curve should move towards or away from the diagonal in the normalized lumas plot, which corresponds to an identity transform (e.g. 1000 nit maximum luminance image being optimal for 1000 nit maximum capability display, ergo, no mapping on those image lumas should be applied to obtain the driving image for the display).

The algorithmic components disclosed in this text may (entirely or in part) be realized in practice as hardware (e.g. parts of an application specific IC) or as software running on a special digital signal processor, or a generic processor, etc.

It should be understandable to the skilled person from our presentation which components may be optional improvements and can be realized in combination with other components, and how (optional) steps of methods correspond to respective means of apparatuses, and vice versa. The word "apparatus" in this application is used in its broadest sense, namely a group of means allowing the realization of a particular objective, and can hence e.g. be (a small circuit part of) an IC, or a dedicated appliance (such as an appliance with a display), or part of a networked system, etc. "Arrangement" is also intended to be used in the broadest sense, so it may comprise inter alia a single apparatus, a part of an apparatus, a collection of (parts of) cooperating apparatuses, etc.

The computer program product denotation should be understood to encompass any physical realization of a collection of commands enabling a generic or special purpose processor, after a series of loading steps (which may include intermediate conversion steps, such as translation to an intermediate language, and a final processor language) to enter the commands into the processor, and to execute any of the characteristic functions of an invention. In particular, the computer program product may be realized as data on a carrier such as e.g. a disk or tape, data present in a memory, data travelling via a network connection-wired or wireless-, or program code on paper. Apart from program code, characteristic data required for the program may also be embodied as a computer program product.

Some of the steps required for the operation of the method may be already present in the functionality of the processor instead of described in the computer program product, such as data input and output steps.

It should be noted that the above-mentioned embodiments illustrate rather than limit the invention. Where the skilled person can easily realize a mapping of the presented examples to other regions of the claims, we have for conciseness not mentioned all these options in-depth. Apart from combinations of elements of the invention as combined in the claims, other combinations of the elements are possible. Any combination of elements can be realized in a single dedicated element.

Any reference sign between parentheses in the claim is not intended for limiting the claim. The word "comprising" does not exclude the presence of elements or aspects not listed in a claim. The word "a" or "an" preceding an element does not exclude the presence of a plurality of such elements.

The invention claimed is:

1. An encoder comprising:

a processor circuit and a memory circuit, wherein the memory is arranged to store instructions for the processor circuit, wherein the processor circuit is arranged to encode an input high dynamic range image as encoded data, wherein the input high dynamic range image has a high dynamic range, wherein the encoded data comprises a matrix of pixel colors of a lower dynamic range image and a metadata of the lower dynamic range image, wherein the lower dynamic range is lower than the high dynamic range, wherein the metadata comprises a luma mapping function, wherein the luma mapping function is arranged to calculate high dynamic range pixel lumas of the input high dynamic range image by applying the luma mapping function to pixel lumas of the lower dynamic range image, wherein the processor circuit is arranged to receive the luma mapping function from a connectable or comprised inverse tone mapping system, wherein the inverse tone mapping system is arranged to derive an up-grading function, wherein the up-grading function is based on analyzed properties of a master low dynamic range image, wherein the up-grading function is arranged to calculate the input high dynamic range image from the master low dynamic range image by applying the up-grading function to lumas of the master low dynamic range image, wherein the inverse tone mapping system is arranged to invert the up-grading function so as to obtain the luma mapping function;

a mapping splitting circuit, wherein the mapping splitting circuit is arranged to compose the luma mapping function into a first data item and a second data item, wherein the first data item is a stretched luma mapping function, wherein the stretched luma mapping function is defined by mapping a clipping point of the luma mapping function onto an endpoint, wherein the clipping point is where the luma mapping function reaches a maximum output value, wherein the endpoint has as coordinates a maximum of an input value and the maximum output value, wherein the clipping point corresponds to a horizontal scaling factor, wherein the mapping splitting circuit is arranged to map each point of the luma mapping function having an input coordinate less than the input coordinate of the clipping point to a stretched input coordinate by multiplying the input coordinate of each such point by a horizontal scaling factor, and maintaining the output coordinate of each such point, wherein the second data item is a scale factor, wherein the scale factor is equal to the reciprocal of the horizontal scaling factor; and a formatter circuit, wherein the formatter circuit is arranged to output the stretched luma mapping function and the scaling value as metadata of the lower dynamic range image.

2. The as claimed in claim 1, further comprising a clipping detection circuit, wherein the clipping detection circuit is arranged to detect whether the luma mapping function comprises clipping to the maximum output value.

3. The encoder as claimed in claim 1, wherein the input high dynamic range image and the lower dynamic range image are defined on an absolute nit dynamic range which end at a maximum luminance.

4. The encoder as claimed in claim 3, wherein the low dynamic range image has a maximum luminance equal to 100 nit.

5. A method comprising:

encoding an input high dynamic range image as encoded data, wherein the input high dynamic range image has a high dynamic range, wherein the encoded data comprises a matrix of pixel colors of a lower dynamic range image and a metadata of the lower dynamic range image, wherein the lower dynamic range is lower than the high dynamic range, wherein the metadata comprises a luma mapping function, wherein the luma mapping function is arranged to calculate high dynamic range pixel lumas of the high dynamic range image by applying the luma mapping function to pixel lumas of the lower dynamic range image;

receiving a luma mapping function from a connectable or comprised inverse tone mapping system, wherein the inverse tone mapping system is arranged to derive an up-grading function, wherein the up-grading function is based on analyzed properties of a master low dynamic range image, wherein the up-grading function is arranged to calculate the high dynamic range image from the master low dynamic range image by applying the up-grading function to lumas of the master low dynamic range image, wherein the inverse tone mapping system is arranged to invert the up-grading function so as to obtain the luma mapping function;

splitting the luma mapping function into a first data item and a second data item, wherein the first data item is a stretched luma mapping function, wherein the stretched luma mapping function is defined by mapping a clipping point of the luma mapping function onto an endpoint, wherein the clipping point is where the luma mapping function reaches a maximum output value, wherein the endpoint has as coordinates a maximum of an input value and the maximum output value, wherein the clipping point corresponds to a horizontal scaling factor;

mapping each point of the luma mapping function having an input coordinate less than the input coordinate of the clipping point to a stretched input coordinate by multiplying the input coordinate of each such point by a horizontal scaling factor and maintaining the output coordinate of each such point;

wherein the second data item is a scale factor, wherein the scale factor is equal to the reciprocal of the horizontal scaling factor; and outputting the stretched luma mapping function and the scaling value as metadata of the lower dynamic range image.

6. The method as claimed in claim 5, further comprising detecting whether the luma mapping function comprises clipping to the maximum output value.

7. The method as claimed in claim 5, wherein the input high dynamic range image and the lower dynamic range image are defined on an absolute nit dynamic range which ends at a maximum luminance.

8. The method as claimed in claim 7, wherein the low dynamic range image has a maximum luminance equal to 100 nit.

9. A computer program stored on a non-transitory medium, wherein the computer program when executed on a processor performs the method as claimed in claim 5.

* * * * *